United States Patent [19]

Behrens et al.

[11] Patent Number: 5,490,725
[45] Date of Patent: Feb. 13, 1996

[54] MELT-SEALING DEVICE FOR EXTRUDERS FOR THE PROCESSING OF THERMOPLASTIC POLYMERS OR RUBBER

[75] Inventors: Friedrich-Otto Behrens, Garbsen; Ulrich Proössler, Uetze; Jürgen Voigt, Wathlingen, all of Germany

[73] Assignee: Hermann Berstorff Maschinenbau GmbH, Hannover, Germany

[21] Appl. No.: 313,870

[22] Filed: Sep. 28, 1994

[30] Foreign Application Priority Data

Sep. 30, 1993 [DE] Germany .......................... 43 33 233.1

[51] Int. Cl.⁶ ................................ B28C 7/04; B29B 7/42
[52] U.S. Cl. ........................... 366/76.9; 366/82; 366/88; 366/89; 366/90
[58] Field of Search ......................... 366/75, 76, 79–82, 366/88–90, 322–323, 76.1, 76.9, 76.93; 425/203, 208, 209

[56] References Cited

U.S. PATENT DOCUMENTS

| | | |
|---|---|---|
| 2,835,514 | 5/1958 | McGahan . |
| 3,360,824 | 1/1968 | Schippers ............................ 366/81 X |
| 3,814,779 | 6/1974 | Wiley .................................. 366/82 X |
| 3,917,507 | 11/1975 | Skidmore ............................ 366/75 X |
| 4,447,156 | 5/1984 | Csongor ............................. 366/322 X |
| 4,573,799 | 3/1986 | Anders ............................... 366/323 X |
| 4,652,138 | 3/1987 | Inoue et al. ........................ 366/323 X |
| 4,708,623 | 11/1987 | Aoki et al. ......................... 425/203 X |
| 4,729,666 | 3/1988 | Takubo .............................. 425/208 X |
| 4,867,927 | 9/1989 | Funaki et al. ...................... 366/88 X |

FOREIGN PATENT DOCUMENTS

| | | |
|---|---|---|
| 1145787 | 3/1963 | Germany . |
| 1454745 | 5/1969 | Germany ............................. 366/75 |
| 2203760 | 1/1972 | Germany . |
| 2413374 | 10/1975 | Germany . |
| 2237190 | 3/1976 | Germany . |
| 3921108C1 | 6/1990 | Germany . |
| 1153678 | 5/1969 | United Kingdom .................. 366/79 |

*Primary Examiner*—Charles E. Cooley
*Attorney, Agent, or Firm*—Foley & Lardner

[57] ABSTRACT

A melt-sealing device for extruders for thermoplastic polymers or rubber for sealing off the gear unit side against high-melt pressure, in which sealing is effected by the configuration of the extruder screw which includes an intake section, a compression section having a channel depth that decreases in the conveying direction, a metering section with a constant screw channel depth, a smooth annular melt channel section, and a blister element with an annular gap for the sealing melt.

4 Claims, 3 Drawing Sheets

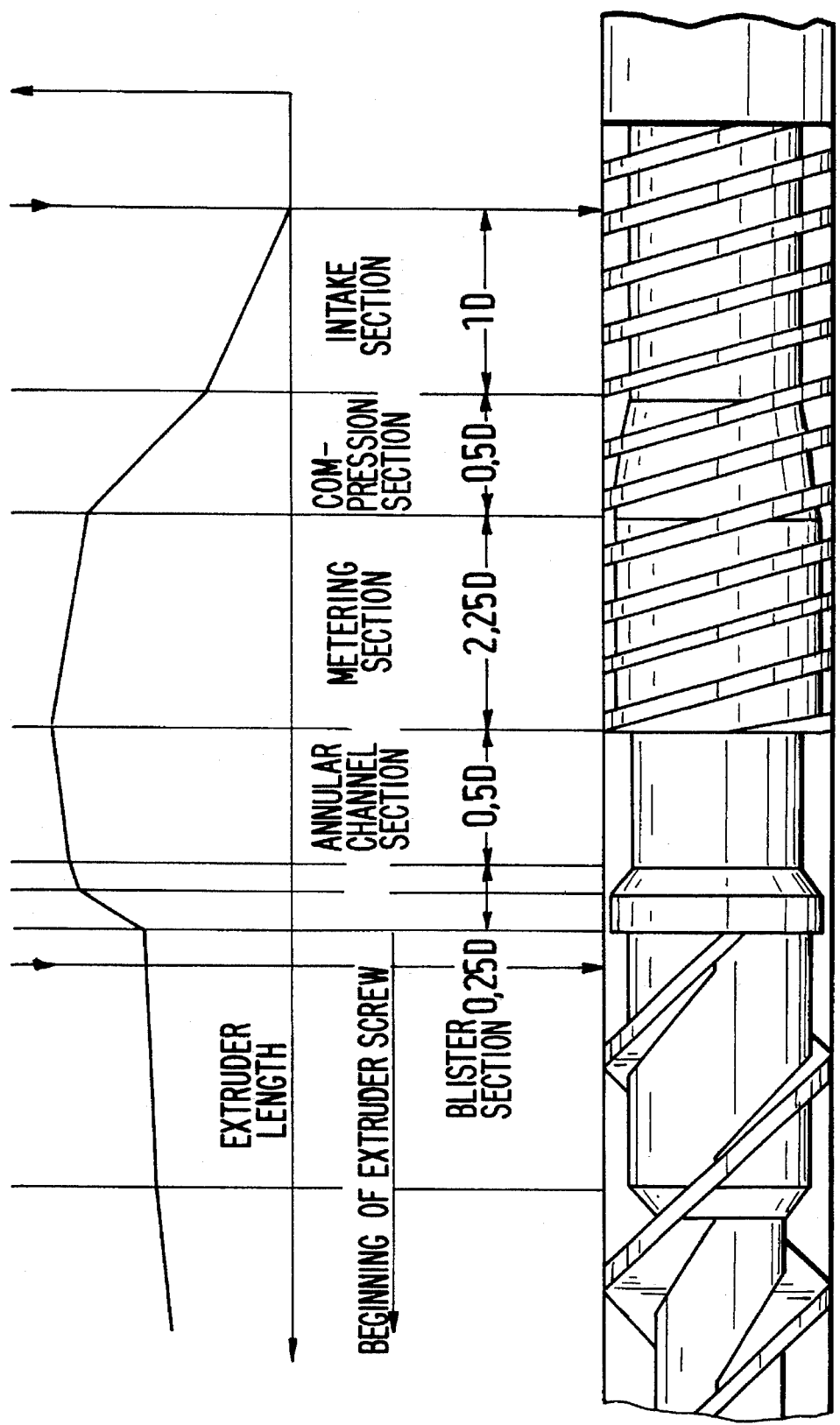

MELT-SEALING DEVICE FOR EXTRUDERS FOR THE PROCESSING OF THERMOPLASTIC POLYMERS OR RUBBER

BACKGROUND OF THE INVENTION

The present invention relates to a melt-sealing device for extruders for the processing of thermoplastic polymers or rubber for sealing off the gear unit side of a conveying screw against high melt pressures within the extrusion chamber.

DE-AS 22 03 760 discloses a sealing device on the gear unit side of a rotating extruder screw. An intermediate chamber is arranged at the end of the screw on the gear unit side through which a highly pressurized additive is pressed into the actual extrusion chamber by a return thread in order to seal the extrusion chamber. A sealing on the gear unit side with regard to the additive cannot be obtained with a device of this type.

U.S. Pat. No. 2,835,514 discloses a sealing device that requires a multitude of complicated seals, which are subject to wear, for sealing the screw end on the gear unit side.

SUMMARY OF THE INVENTION

The present invention achieves a highly efficient sealing of the screw end on the gear unit side by means of extremely simple and wear-resistant elements. Parts that are subject to wear are not used, and the use of the sealing agent does not produce any negative effects. The seal renews itself continuously so that the formation of material deposits, which might lead to malfunctions, is avoided.

The melt-sealing device of the invention comprises various extruder sections including an intake screw section for conveying pellets in the extrusion direction, a compression section with a screw channel depth that decreases in conveying direction, a metering section with a constant screw channel depth, a smooth annular melt channel section without screw channels and with a minimum length of 0.5D (one-half screw diameter), and a blister element with an annular gap for the sealing melt.

By arranging an intake screw section for feeding pellets combined with a compression section for generating the melt pressure, a metering section for maintaining the built-up melt pressure, and an annular channel section with a blister end for generating a high-pressure zone, a melt-sealing device is created that works reliably even with extremely high melt pressures.

It is of special importance that this sealing system does not present any wear and can be fed with plastics pellets that are usually extruded so that no problems occur in this respect. There are no material deposits, and the sealing material; that is, the molten pellets, is constantly renewed.

BRIEF DESCRIPTION OF THE APPLICATION DRAWINGS

The invention described below is based on embodiments shown in the application drawings in which:

FIG. 3 is a pressure curve of the melt-sealing device combined with various sealing components.

DETAILED DESCRIPTION OF THE PREFERRED EMBODIMENTS

Figure 1:
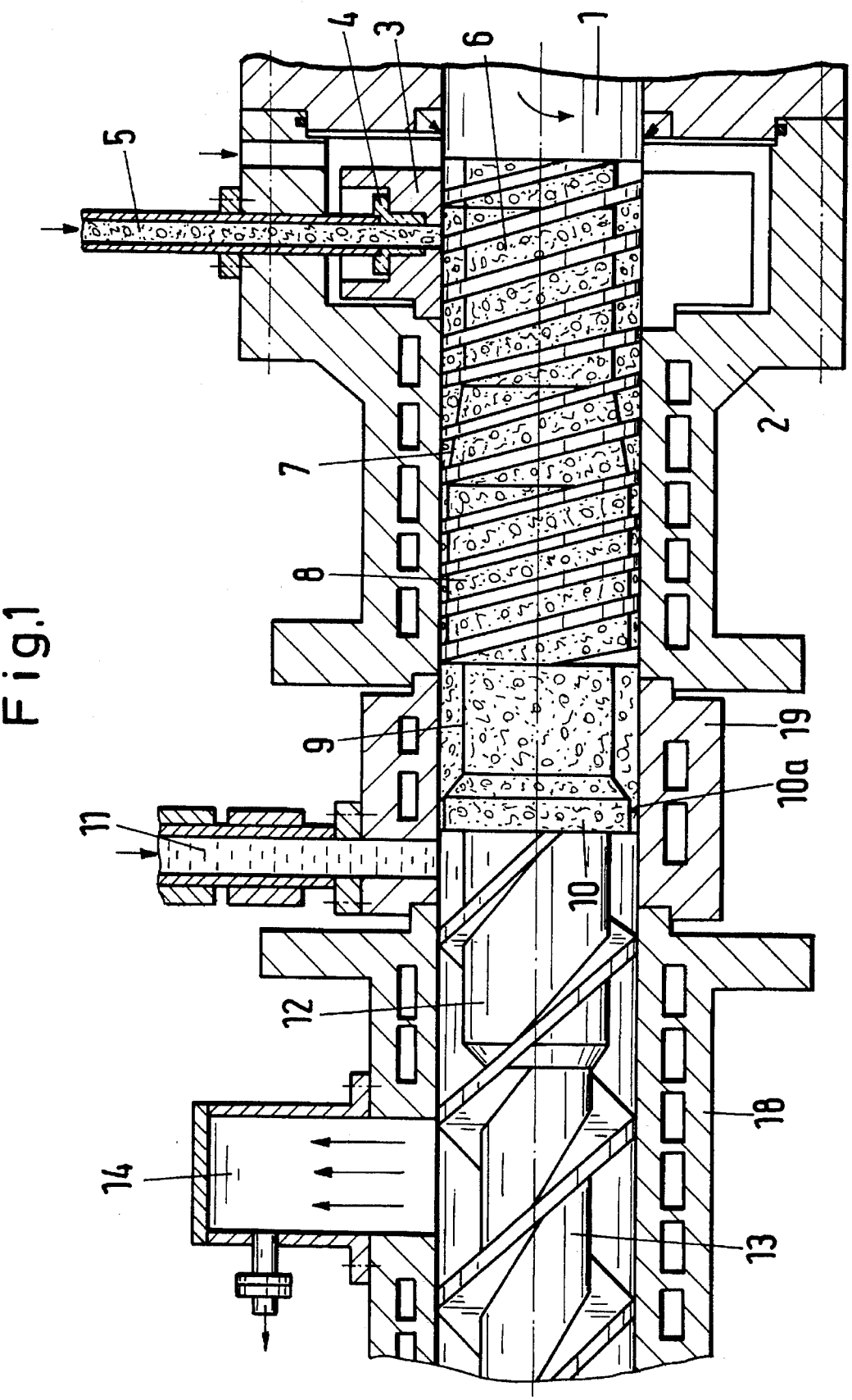
FIG. 1 is a longitudinal section of an extruder of the invention formed with a degassing device.

The extruder shown in FIG. 1 comprises a screw 1 that is arranged in a cylindrical housing 2 which comprises filler section 19 and cylindrical housing section 18. The intake liner 3 is provided with a feed socket 5 and an insulating sleeve 4 for reducing the heat transfer between the feed socket 5 and the pellets contained in it. The pellets that are introduced into the feed socket 5 are preferably monitored by an optical flowmeter not shown in the drawing. The insulating sleeve 4 serves to avoid agglomeration of the pellets which might lead to a clogging of the feed socket.

The screw of the melt-sealing device is composed of an intake section 6, a compression section 7, a metering section 8, an annular channel section 9, and the blister element 10.

With the extruder shown in FIG. 1, the melt to be extruded and containing residual monomers is introduced into the screw section 12 together with a stripping agent (e.g., water) through the melt line 11. Up to a temperature of 280° C., the low-viscosity polyethylene (PE) melt presents a back pressure which is maintained up to a pressure of 65 bar and caused by the residual monomers and the water. The pressure relief obtained by using a screw section 13 with an extremely enlarged free volume provokes a foaming of the volatile components in the melt below the vapor pressure when the volatiles turn into the vapor phase due to the pressure relief. Owing to the foaming process, the residual monomers are removed from the PE melt together with the vapor through the degassing dome 14, which ensures an excellent degassing of the melt.

Due to the melt pressure of up to 65 bar and the low viscosity in the transition area between melt line 11 and screw section 12, the sealing on the gear unit side (to the right as viewed in FIGS. 1 and 2) of the screw 1 is rather critical. Only the melt-sealing device according to the present invention has allowed to obtain a very reliable and long-lasting sealing up to a melt pressure of 500 bar.

The melt-sealing device of the invention functions as follows. When processing low-viscosity melts or melts with flammable blowing agents, flammable gases or stripping agents, the sealing of the shaft toward the drive unit (e.g., gear unit) often leads to problems with melt-fed machines. These problems are efficiently solved by the melt seal according to the invention, which is automatically built up and constantly renewed owing to a screw geometry of special design, while the same raw materials (fresh or reclaimed material) are used.

The raw material of the pellets corresponds to the material processed in the plasticizing machine and is continuously fed through the feed socket 5 into the intake liner 3. Due to the energy input, the pellets are transformed into melt and conveyed at a high pressure through the metering section 8 toward the extrusion head. The melt passes the annular melt channel 9 and the blister gap 10a.

Owing to the higher pressure build-up capacity in the pellet plasticizing sections 6, 7 and 8 relative to the melt pressure in the sections 11, 12, the material or material components are prevented from leaking through the screw shaft toward the drive unit.

As compared to the extruder output, the pellet throughput is intentionally kept at a low level. It amounts to approximately 0.5 to 1% of the extruder throughput and bears no or only a minor influence on the material to be processed. The pellet throughput is determined by the screw geometry and the blister shape.

Additional advantages of this new melt seal result from the continuous renewal of the melt. As the pellets are constantly fed and molten, the formation of material deposits which appear with conventional sealing systems (labyrinth seals, packings, etc.), where no melt exchange takes place, is avoided. Production stops required for replacing defective sealing elements are thus avoided.

Figure 2:
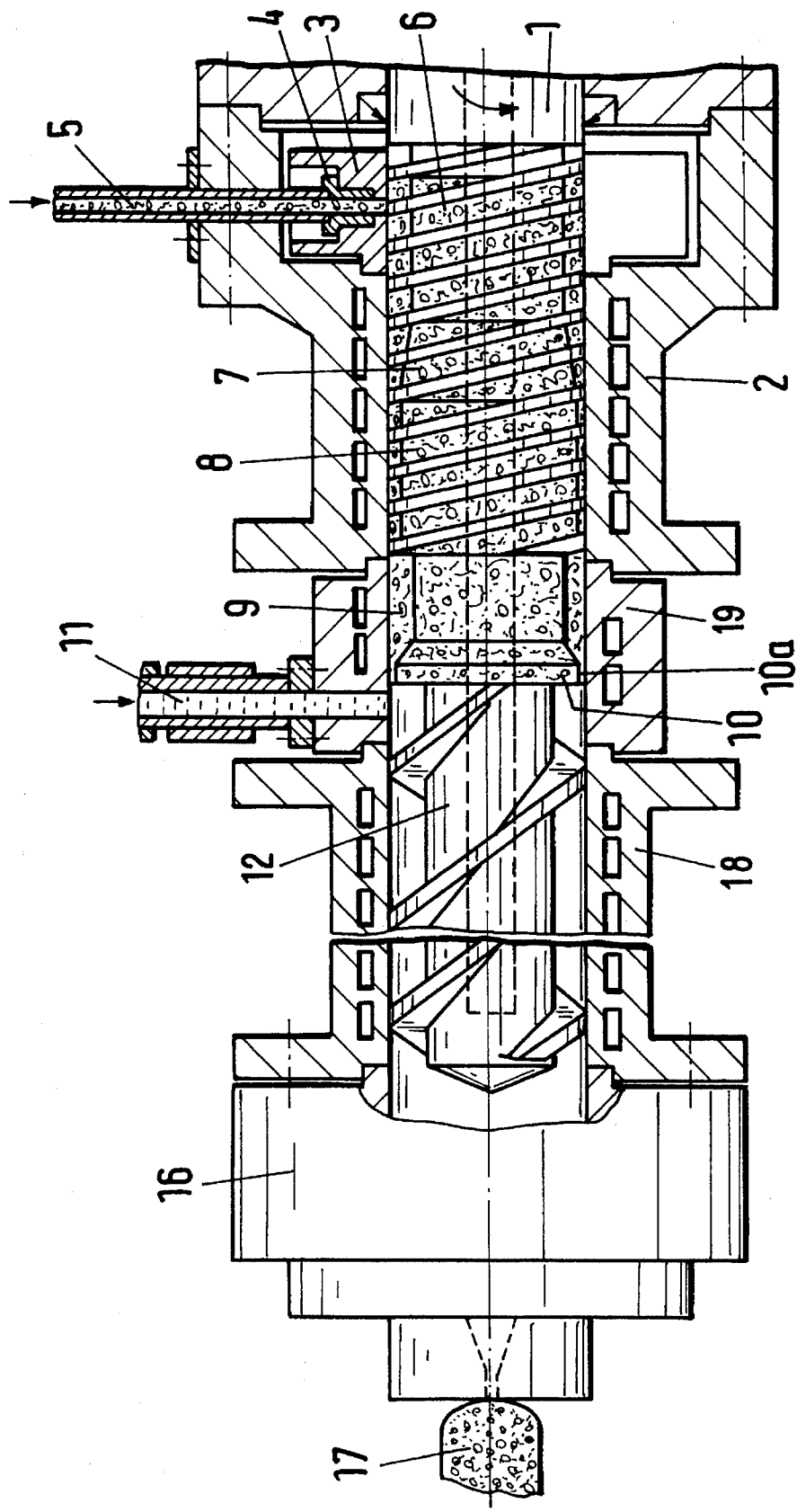
FIG. 2 is a longitudinal section of an extruder embodiment for expanded plastics.

In the extruder shown in FIG. 2, the melt-sealing device is used for the second cooled extruder of a tandem extrusion combination for the production of expanded polystyrene film.

A melt/blowing agent mixture is conveyed at a pressure of up to 450 bar from the first extruder, which is not shown in the drawing, through the melt line 11 into the second extruder. It has to be ensured that no blowing agent escapes toward the gear unit side since this would cause density variations within the foam and lead to certain risks with flammable blowing agents. However, with the melt-sealing device corresponding to the invention, these problems are perfectly solved despite the extremely high pressure.

In this case, the melt seal is again constantly renewed by the pellets fed through feed socket 5, with the minor share of melt without blowing agent produced by the sealing system being completely incorporated. The melt/blowing agent mixture is conveyed through the extrusion die 16 and expands to form a bubble 17 after having left the die. It is then cut, collapsed and rolled up.

FIG. 3 shows the pressure curve within the melt-sealing device. The most favorable lengths of the different sections, expressed in terms of screw diameter D, for the extrusion of a polystyrene/blowing agent melt at a pressure of 350 bar are as follows:

Intake section=1D

Compression section=0.5D

Metering section=2.25D

Annular channel section with blister=0.75D

Blister section=0.25D

The screw channel depth in the metering section 8 is preferably 0.01D, and the channel depth in the annular melt channel section 9 is preferably 0.10D.

Owing to the design of the annular gap and the blister, a uniform pressure distribution is obtained at the blister gap, and a backflow of the melt over the screw flights occurring with return threads is excluded.

What is claimed is:

1. A melt-sealing device for extruders for the processing of thermoplastic polymer or rubber for sealing off a gear unit side of a conveying screw against high melt pressures within an extrusion chamber defined by the screw and an extruder housing, wherein the conveying screw has a screw configuration which comprises the melt-sealing device and which includes:

an intake section for receiving material pellets and conveying said pellets in a conveying direction toward an extrusion outlet, said intake section being formed with an intake liner with a feed opening for pellets, said feed opening being provided with an insulating sleeve to prevent agglomeration of the pellets, a compression section having a screw channel depth that decreases in the conveying direction, a metering section with a constant screw channel depth, a smooth annular melt channel section devoid of screw channels and having a channel depth and a minimum length of half the diameter of the screw, and a blister element downstream of said annular melt channel section in the conveying direction, said blister element having a peripheral surface which defines with said extruder housing an annular gap through which the melt passes.

2. The melt-sealing device of claim 1, wherein said intake section has a length of 1D, said compression section has a length of 0.5D, said metering section has a length of 2.25D, said annular melt channel section has a length of 0.5D, and said blister element has a length of 0.25D, wherein D is equal to the screw diameter.

3. The melt-sealing device of claim 1, wherein the screw channel depth in the metering section is 0.01D, while the channel depth in the annular melt channel section is approximately 0.10D, wherein D is equal to the screw diameter.

4. The melt-sealing device of claim 1, wherein said sealing device is used in an extruder that further includes an inlet downstream of said blister element for introducing into the extruder a highly pressurized polymer melt mixed with a blowing agent.

* * * * *